United States Patent
Suh et al.

(10) Patent No.: US 6,590,180 B1
(45) Date of Patent: Jul. 8, 2003

(54) LASER WELDING SYSTEM

(75) Inventors: Jeong Suh, Pusan (KR); Je Hoon Lee, Taejon (KR); Jeong Oh Kim, Taejon (KR); You Hie Han, Taejon (KR)

(73) Assignee: Korea Institute of Machinery and Materials, Taejon (KR)

( * ) Notice: Subject to any disclaimer, the term of this patent is extended or adjusted under 35 U.S.C. 154(b) by 0 days.

(21) Appl. No.: 09/937,957
(22) PCT Filed: Aug. 31, 2000
(86) PCT No.: PCT/KR00/00988
§ 371 (c)(1), (2), (4) Date: Sep. 28, 2001
(87) PCT Pub. No.: WO01/56735
PCT Pub. Date: Aug. 9, 2001

(30) Foreign Application Priority Data

Feb. 2, 2000 (KR) .......................................... 2000-2959

(51) Int. Cl.⁷ .............................................. B23K 26/26
(52) U.S. Cl. ................... 219/121.63; 219/161
(58) Field of Search ...................... 219/121.63, 121.64, 219/161, 101

(56) References Cited

U.S. PATENT DOCUMENTS

| | | | |
|---|---|---|---|
| 4,706,871 A | * | 11/1987 | Kajiwara et al. |
| 5,098,005 A | * | 3/1992 | Jack |
| 5,614,112 A | * | 3/1997 | Peru et al. ............. 219/121.63 |
| 5,674,420 A | | 10/1997 | Broderick et al. .......... 219/161 |
| 5,747,768 A | * | 5/1998 | Peru et al. ............. 219/121.63 |
| 5,932,117 A | * | 8/1999 | Johnson et al. ........ 219/121.63 |
| 6,080,961 A | * | 6/2000 | Suzuki .................. 219/121.63 |

* cited by examiner

Primary Examiner—Geoffrey S. Evans
(74) Attorney, Agent, or Firm—Merchant & Gould P.C.

(57) ABSTRACT

The laser welding system including a welding frame for receiving a first steel plate to be welded thereupon, at least one first clamping member to be installed above the welding frame, for fixing the first steel plate received on the welding frame, at least one second clamping member for fixing a second steel plate to be welded in close vicinity to a position at which the first steel plate is to be engaged with and welded with the second steel plate, an anvil on which the second steel plate is received, for moving the second steel plate to the position at which the first steel plate is to be engaged with and welded with the second steel plate, and a laser welding head for welding the first and second steel plates at the position at which the first steel plate is to be welded with the second steel plate. The first and second clamping members and anvil are operated by air bags.

10 Claims, 6 Drawing Sheets

<BEFORE OPERATION OF A SECOND CLAMPING MEMBER AND AN ANVIL>

<AFTER OPERATION OF A SECOND CLAMPING MEMBER AND AN ANVIL>

FIG.6

LASER WELDING SYSTEM

BACKGROUND OF THE INVENTION

1. Field of the Invention

The present invention relates to a laser welding system, and more particularly to a laser welding system in which by minimizing the gaps of the engaging surfaces based on the operations of the clamping members and the anvils when a tailored blanks utilized in industrial structure are welded, the engaging surfaces of the engaging portions become stable. Thus, since the welding is accomplished with rapidity and ease, improving the qualities of the welding portions and enhancing the reliability of the structure, and the equipment lines are simple, and thereby reducing the manufacturing cost of the welding object and decreasing the welding time.

2. Description of the Prior Art

A tailored blank is a member manufactured by butt-welding two steel plates of different thickness by laser welding. The tailored blank is molded by a press or a roll-molding device, and is used in the body, the door, and the bumper of a car. Therefore, a high quality is needed in the tailored blank, and the tailored blank needs mass-producing.

Currently, Nothelfer Co. of Germany, Sudronic Co. Of Swiss, and VIL Co. of the U.S. manufacture welding systems for producing tailored blanks.

The welding system of Nothelfer Co. feeds two steel plates from a front side in a chain manner. The two fed steel plates are pressed by rollers, and are butt-welded according to a welding line, and a laser beam head is fixed to the welding device.

The welding system of Sudronic Co. uses a shuttle in which two steel plates are butted to accomplish the welding, and a laser beam head is fixed to the welding device. The welding system employs a gap removing manner named Souka, which rolls thick steel plates to bridge the gap.

In the welding system of VIL Co., two steel plates are fed from the both sides of the system respectively, and are butted together, and a laser bead head welds the plates. In the welding system of VIL Co., the two plates are arranged by using pins so as to butt each other, and a separate device is used to bridge the gap.

However, in the welding system of VIL Co., since the welded tailored blank is fed reversibly in a direction, the tailor blanks cannot be continuously manufactured. Furthermore, since two rows of pins are used to arrange the steel plates in a welding line, the number of parts and assembling processes are increased. Moreover, since clamping members are integrally formed, problems can occur when over two plates are welded.

Furthermore, in the welding systems of Sudronic Co. and VIL Co., in order to accurately arrange pins in the welding lines, the systems should be precisely machined. Since the engaging portions are not stable, fine defects and foreign substances can be formed in the welded surfaces, and thereby decreasing the overall durability of the welding structures.

SUMMARY OF THE INVENTION

The present invention has been made to solve the aforementioned problem, and accordingly, it is an object of the present invention to provide a laser welding system in which by bridging the gaps of the engaging surfaces based on the operations of the clamping members and the anvils when a tailored blanks used industrial structure are welded, the engaging surfaces of the engaging portions become stable. Thus, the welding is accomplished rapidly and easily, and thereby improving the qualities of the welding portions and enhancing the reliability of the structure, and the equipment lines are simple, and thereby reducing the manufacturing cost of the welding object and lessening the welding time.

In order to achieve the aforementioned object of the present invention, the present invention provides a laser welding system comprising: a welding frame for receiving a first steel plate to be welded thereupon; at least one first clamping member installed above the welding frame, for fixing the first steel plate received on the welding frame; at least one second clamping member for fixing a second steel plate to be welded in close vicinity to a position at which the first steel plate is to be engaged with and welded with the second steel plate; an anvil on which the second steel plate is received, for moving the second steel plate to the position at which the first steel plate is to be engaged with and welded with the second steel plate; and a laser welding head for welding the first and second steel plates at the position at which the first steel plate is to be welded with the second steel plate.

Preferably, the laser welding system further comprises a first upper support, a second support, a first air bag provided between the first upper support and the first clamping member, for inflating when the first clamping member fixes the first steel plate, and a second air bag provided between the second upper support and the second clamping member, for inflating when the second clamping member fixes the second steel plate.

Preferably, the laser welding system further comprises a first air cylinder installed at the first upper support, for separating the first clamping member from the first steel plate after the welding is completed, and a second air cylinder installed at the second upper support, for separating the second clamping member from the second steel plate after the welding is made.

Preferably, the laser welding system further comprises means for moving the anvil towards the position at which the first steel plate is to be welded with the second steel plate, so that the anvil moves the second plate to the position at which the first steel plate is to be engaged with and welded with the second steel plate.

Preferably, the means for moving the anvil comprises a lower support, a pivoting member engaged with a third hinge and having one side fixed to the anvil, and a third air bag provided between the lower support and the pivoting member, for inflating to pivot the pivoting member when the anvil is moved to a position at which the first steel plate is to be welded with the second steel plate.

Preferably, the means for moving the anvil further comprises a third air cylinder installed at the lower support, for moving the anvil to an initial position after the welding is completed.

Preferably, the third air bag is shrunk after the welding is completed, and the third air cylinder presses one side of the pivoting member to move the anvil to the initial position.

Preferably, the first clamping member has a first thickness that is thick enough not to bend when the first clamping member is operated, and the second clamping member has a second thickness that is thin enough to bend when the second clamping member is operated.

Preferably, portions of the first and second clamping members at which the first and second clamping members are engaged with the first and second steel plates have saw-teeth respectively.

Preferably, a portion of the anvil has saw-teeth so that the second steel plate should not slide from the anvil when the anvil moves the second steel plate to the position at which the first steel plate is to be engaged with and welded with the second steel plate.

Preferably, a plurality of first clamping members, a plurality of second clamping members, and a plurality of anvils are provided.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENT

Hereinafter, preferred embodiments of the present invention will be explained in detail with reference to the attached drawings.

Figure 1:
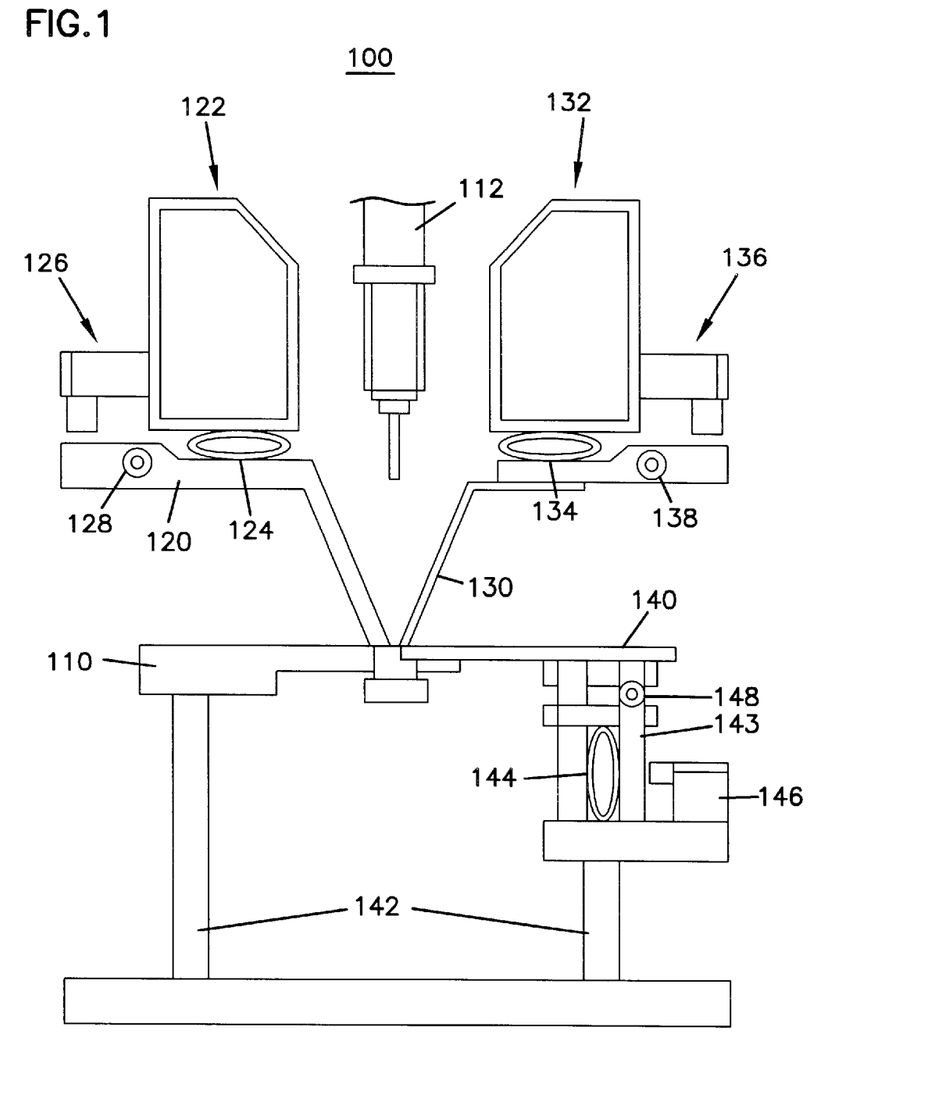
FIG. 1 is a side view for showing a laser welding system according to a preferred embodiment of the present invention.
Figure 2:
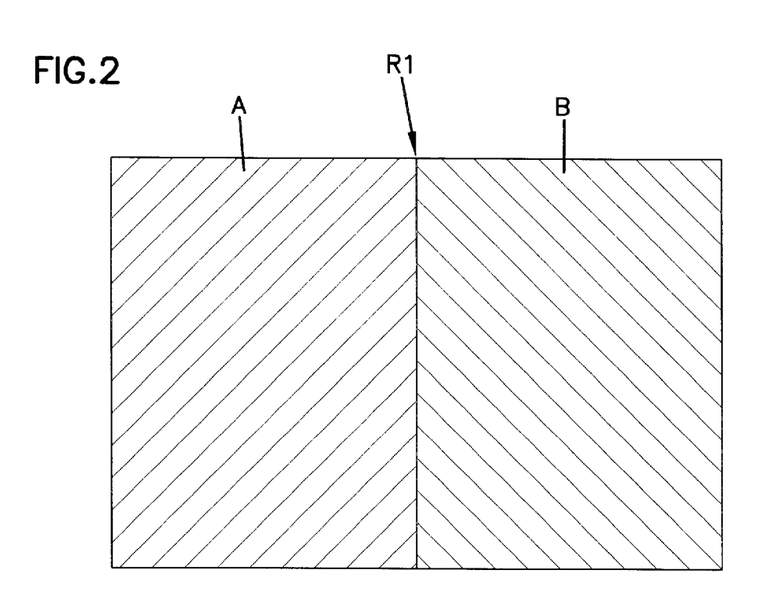
FIG. 2 is a plan view of a welding object, which is manufactured by the laser welding system shown in FIG. 1.
Figure 3:
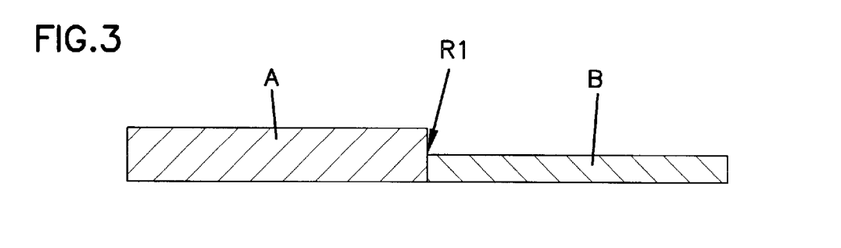
FIG. 3 is a side view of a welding object that is manufactured by the laser welding system shown in FIG. 1.

FIG. 1 is a side view showing a laser welding system based on the preferred embodiment of the present invention. FIGS. 2 and 3 are side and plan views showing a welding object that is manufactured by the laser welding system shown in FIG. 2, respectively.

Referring to FIG. 1, the laser welding system according to the present invention includes a welding frame 110, a first clamping member 120, a second clamping member 130, an anvil 140, and a laser welding head 112.

A first steel plate A to be welded is received on the welding frame. The first clamping member fixes the first steel plate A received on the welding frame 110, and is installed above the welding frame 110.

At least, one second clamping member 130 is installed to fix the second steel plate B to be welded in close vicinity to a position at which the first steel plate A is to be engaged with and welded with the second steel plate B.

The second steel plate B is received on the anvil 140, and the anvil 140 moves the second steel plate B to the position at which the first steel plate A is to be engaged with and welded with the second steel plate B.

The first and second steel plates A and B which are engaged with each other at the position at which the first steel plate A is to be welded with the second steel plate B are welded together by the laser welding head 112.

The laser welding system 100 further includes a first upper support 122, a second upper support 132, a first air bag 124, and a second air bag 134.

The first air bag 124 is provided between the first upper support 122 and the first clamping member 120. The first air bag 124 inflates to pivot the first clamping member 120, when the first clamping member 120 fixes the first steel plate A.

The second air bag 134 is provided between the second upper support 132 and the second clamping member 130. The second air bag 124 inflates to pivot the second clamping member 130, when the second clamping member 130 fixes the second steel plate B.

The laser welding system 100 further includes a first air cylinder 126 and a second air cylinder 136.

The first air cylinder 128 is installed at the first upper support 122, and separates the first clamping member 120 from the first steel plate A after the welding is completed. The second air cylinder 136 is installed at the second upper support 132, and separates the second clamping member 120 from the second steel plate B after the welding is completed.

The first clamping member 120 is engaged with a first hinge 128, and the first air cylinder 126 presses one side of the first clamping member 120 to separate the first clamping member 120 from the first steel plate A, after the welding is completed.

The second clamping member 130 is engaged with a second hinge 138, and the second air cylinder 136 presses one side of the second clamping member 130 to separate the second clamping member 130 from the second steel plate B, after the welding is completed.

The laser welding system 100 further comprises means for moving the anvil 140 towards the position at which the first steel plate A is to be welded with the second steel plate B, so that the anvil 140 moves the second plate B to the position at which the first steel plate A is to be engaged with and welded with the second steel plate B.

The means for moving the anvil 140 comprises a lower support 142, a pivoting member 143, and a third air bag.

The pivoting member 143 is engaged with a third hinge 148 and has one side fixed to the anvil 140. The third air bag 144 is provided between the lower support 142 and the pivoting member 143.

The third air bag 144 inflates to pivot the pivoting member 143, when the anvil 140 is moved to a position at which the first steel plate A is to be welded with the second steel plate B.

The means for moving the anvil 140 further comprises a third air cylinder 146 installed at the lower support 142, for moving the anvil 140 to the initial position after the welding is completed.

The third air bag 144 is shrunk after the welding is completed, and the third air cylinder 146 presses one side of the pivoting member 143 to move the anvil 140 to the initial position.

Figure 4:
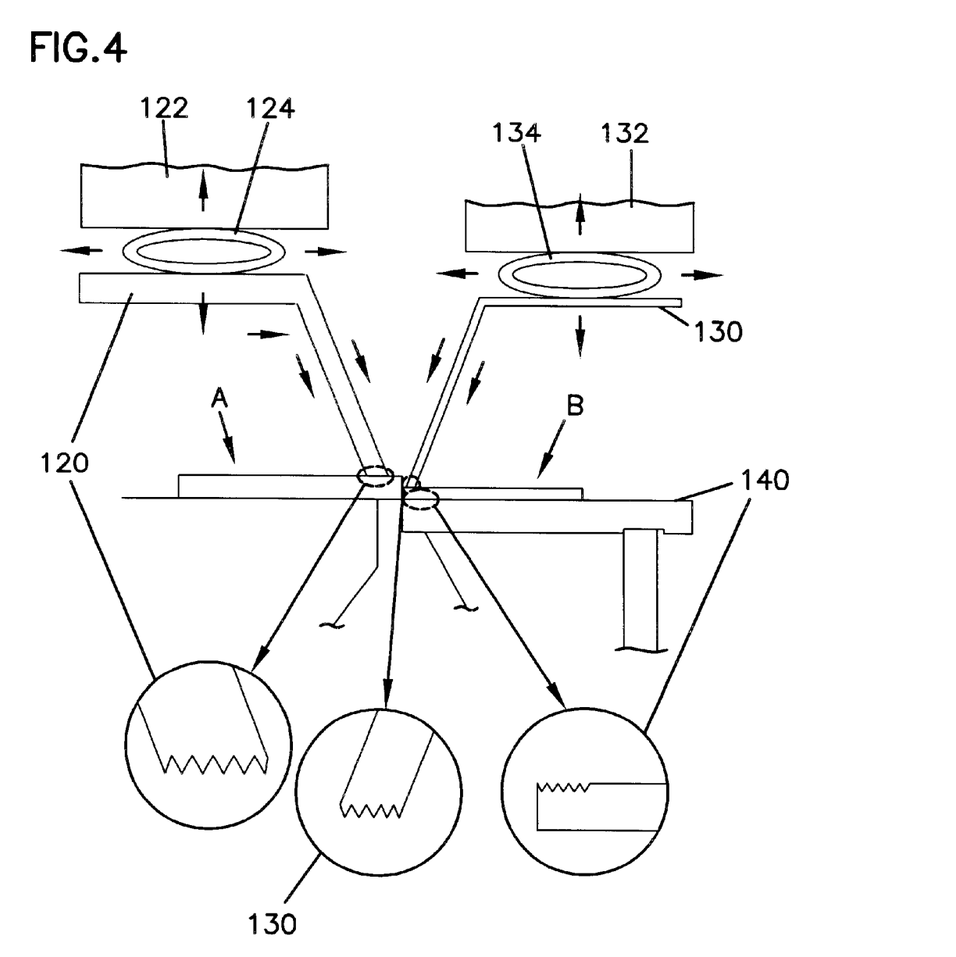
FIG. 4 is a side view for showing a portion of the laser welding system shown in FIG. 1 in detail.

FIG. 4 is a side view showing a portion of the laser welding system shown in FIG. 1 in detail.

Referring to FIGS. 1 to 4, the first and second steel plates A and B shown in FIGS. 2 and 3 are fed horizontally on the welding frame 110 and the anvil 140, respectively. When the airs are filled in the first and second air bag 124 and 134, the first and second clamping members 120 and 130 fixes the first and second steel plates A and B, respectively. In addition, when the third air bag 144 is filled with the air, the anvil 140 is operated to firmly engage the second steel plate B with the first steel plate A.

According to a preferred embodiment of the present invention, the first steel plate A is firstly is received on ar d fixed to the welding frame 110, and the second steel plate B is then received on and fixed to the anvil 140. This is made by the operations of a feeding device (not shown) and the first and second clamping members 120 and 130, which is operated based on the operations of the first and second air bags 124 and 134 respectively.

Referring to FIG. 4, the first clamping member 120 has a first thickness that is thick enough not to bend even when the first clamping member 120 is operated. The second clamping member 130 has a second thickness that is thin enough to bend when the second clamping member 130 is operated.

As shown in FIG. 4, the portions of the first and second clamping members 120 and 130 at which the first and second clamping members 120 and 130 are engaged with the first and second steel plates A and B have saw-teeth respectively.

The saw-teeth prevent the first and second steel plates A and B from slipping when the first and second clamping members 120 and 130 fix the first and second steel plates A and B, and help the engagement of the first and second steel plates A and B.

Further, as shown in FIG. 4, a portion of the anvil 140 has saw-teeth. The saw-teeth of the anvil prevent the second steel plate B from sliding from the anvil 140 when the anvil 140 moves the second steel plate B to the position at which the first steel plate A is to be engaged with and welded with the second steel plate B.

Therefore, the second steel plate B is closely engaged with the first steel plate B, and the operations of the first and second clamping members 120 and 130, and the anvil 140 minimize the gap of the engaging portions at which the first and second steel plates A and B are engaged.

Figure 5:
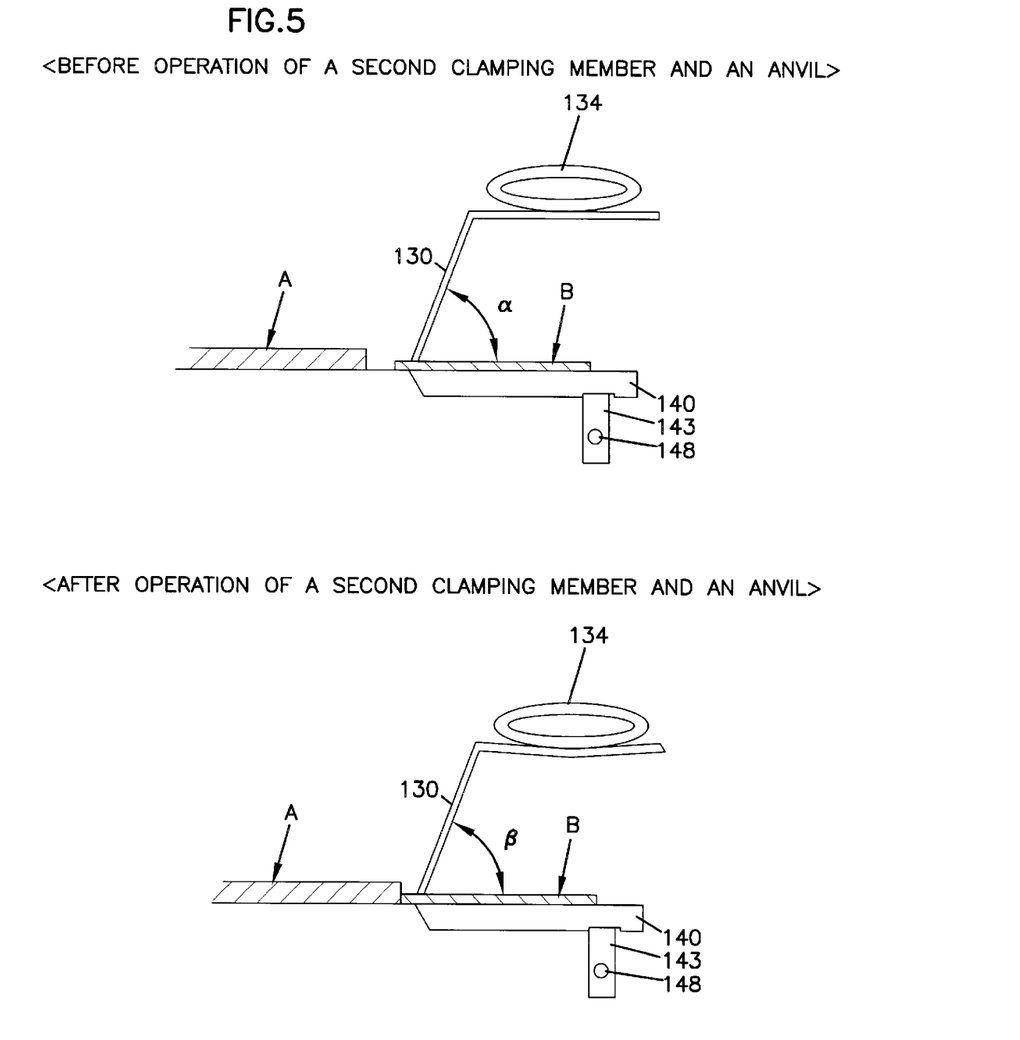
FIG. 5 represents side views showing the operations of the second clamping member and the anvil of the laser welding system shown in FIG. 1.

FIG. 5 are side views showing the operations of the second clamping member and the anvil of the laser welding system shown in FIG. 1.

As shown in FIG. 5, the first steel plate A is fixed on the welding frame 110 by the operation of the first clamping member 120, and then the second steel plate B is engaged with the first steel plate A. Before the operation of the second clamping member 130, the second clamping member 130 is at α-angle with the second steel plate B.

Then, if the second clamping member 130 is operated by the operation of the second air bag 134 and the pivotal movement of the pivoting member 143 operates the anvil 140, the second member 130 is at β-angle with the second steel plate B, and the β-angle is smaller than the α-angle. Then, the second clamping member 130 is resiliently bent.

Figure 6:
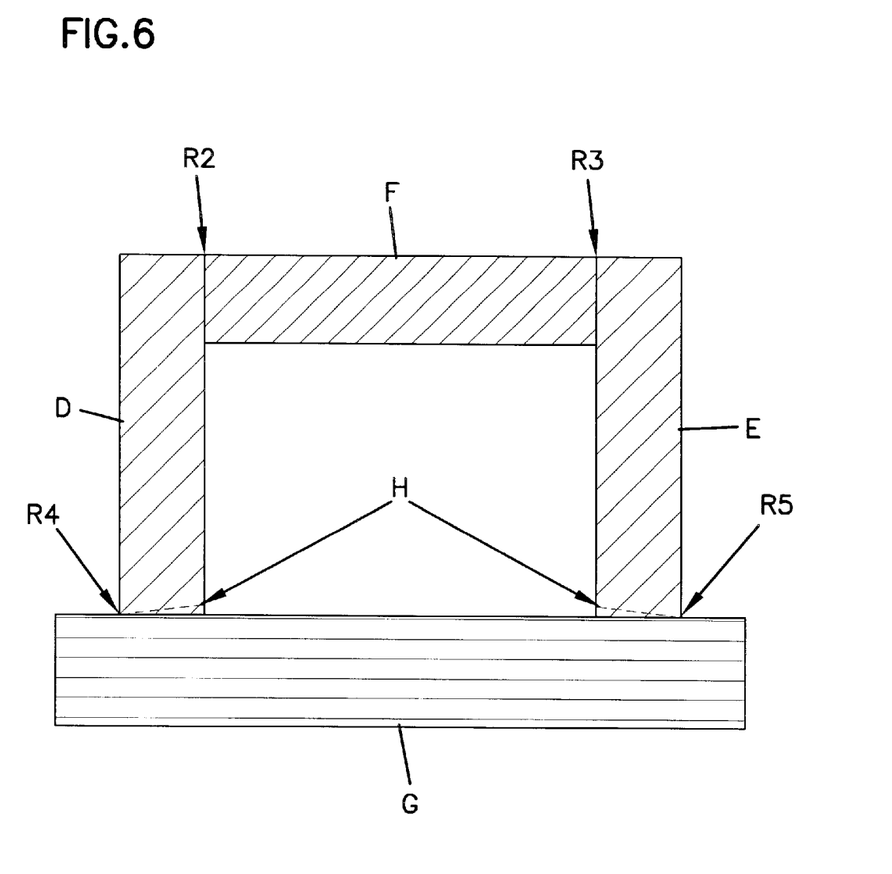
FIG. 6 is a side view showing a welding object which is manufactured by the laser welding system according to another preferred embodiment of the present invention.
Figure 7:
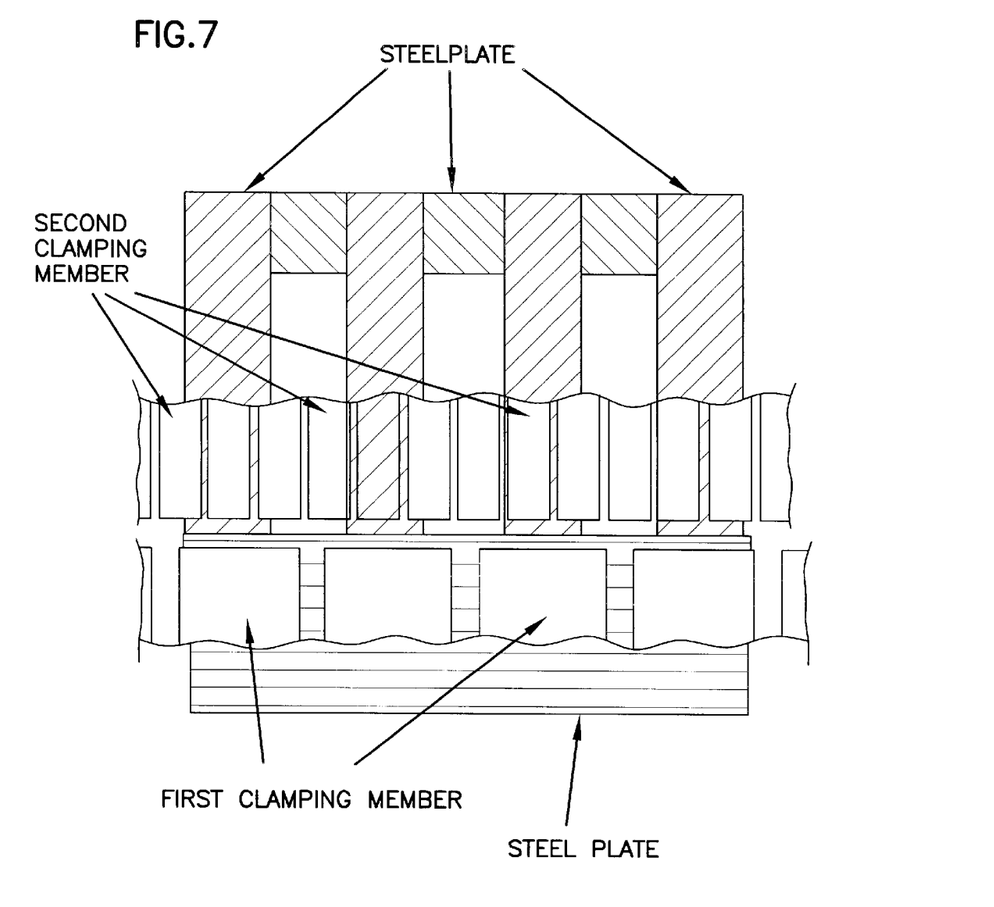
FIG. 7 is a side view showing another welding object that is manufactured by the laser welding system based on the preferred embodiment of the present invention.

FIG. 6 is a side view for showing a welding object that is manufactured by the laser welding system according to another preferred embodiment of the present invention. FIG. 7 is a side view for showing another welding object that is manufactured by the laser welding system according to the preferred embodiment of the present invention.

As shown in FIG. 7, according to a preferred embodiment of the present invention, a plurality of first clamping members 120, a plurality of second clamping members 130, and a plurality of anvils 140 are provided. Therefore, different first clamping members 120, different second clamping members 130, and different anvils 140 are operated according to the engaging positions.

Referring to FIG. 6, in order to butt-weld the stapler-shaped steel plate D, E, and F and another steel plate G, the steel plate D and E is welded to the steel plate F. Therefore, there exist welding lines R2 and R3 in the stapler-shaped steel plate D, E, and F, and the welding lines should be R5 and R6 when the steel plate D, E, and F is welded to the steel plate G.

However, the stapler-shaped steel plate D, E, and F is tortured when it is welded, and the welding lines becomes H. In this case, the welding cannot be properly performed because of the gap portions.

Generally, the laser welding can be effectively accomplished only when the gaps of the engaging portions are smaller than 0.1 mm. Therefore, the gaps of the engaging portions should be removed.

In settle the above-mentioned problem, a technology in which after the H portions of the stapler-shaped steel plate D, E, and F is precisely cut, the steel plate D, E, and F and the steel plate F is welded is disclosed. However, the cutting process is troublesome, and the unit according to the technology becomes complex.

According to the laser welding system according to the present invention, the above-mentioned problem is settled by the operations of a plurality of the second clamping members 130 and a plurality of anvils 140.

After the steel plate G is fixed on the welding frame 110 by the plurality of first clamping members 120, if the plurality of second clamping members 130 and the plurality of anvils 140 are operated, the gaps in the engaging portions between the steel plate D, E, and F and the steel plate G is disappeared. This is possible because the anvil 140 located at a position in which the gap is larger proceeds further, and the corresponding second clamping member 130 is much more bent. At a position in which the gap is smaller, the anvil 140 proceeds less, and the corresponding second clamping member 130 is less bent.

According to experiments, the laser welding system 100 according to the present invention effectively accomplishes the welding even when the gap is over 3 mm. Therefore, the laser welding system according to the present invention is remarkable in the tailored blank manufacturing technology.

The present invention can be applied to a steel plate having several vertical steel plate as well as the stapler-shaped steel plate D, E, and F. FIG. 7 illustrates the positions of the first and second clamping members 120 and 130 in the case.

As above-described, according to the laser welding system of the present invention, by minimizing the gaps of the engaging surfaces according to the operations of the clamping members and the anvils when a tailored blanks used industrial structure are welded, the engaging surfaces of the engaging portions become stable, and thus the welding is accomplished rapidly and easily, thereby improving the qualities of the welding portions and enhancing the reliability of the structure. Further, the equipment lines are simple, thereby reducing the manufacturing cost of the welding object and shortening the welding time.

As stated above, preferred embodiments of the present invention are shown and described. Although the preferred embodiments of the present invention have been described, it is understood that the present invention should not be confined to these preferred embodiments but various changes and modifications can be made by one skilled in the art within the spirit and the scope of the present invention as claimed below.

What is claimed is:
1. A laser welding system comprising:
   a welding frame for receiving a first steel plate to be welded thereupon;
   at least one first clamping member installed above the welding frame, for fixing the first steel plate received on the welding frame;

at least one second clamping member for fixing a second steel plate to be welded in the vicinity of a position at which the first steel plate is to be engaged with and welded with the second steel plate;

an anvil on which the second steel plate is received for moving the second steel plate to the position at which the first steel plate is to be engaged with and welded with the second steel plate;

a laser welding head for welding the first and second steel plates at the position at which the first steel plate is to be welded with the second steel plate; and means for moving the anvil towards the position at which the first steel plate is to be welded with the second steel plate, so that the anvil moves the second plate to the position at which the first steel plate is to be engaged with and welded with the second steel plate, said anvil moving means including a lower support, a pivoting member engaged with a third hinge and having one side fixed to the anvil, and and a third air bag pivoting member when the anvil is moved to a position at which the first steel plate is to be welded with the second steelplate.

2. A laser welding system according to claim 1, further comprising a first upper support, a second support, a first air bag provided between the first upper support and the first clamping member, for inflating when the first clamping member fixes the first steel plate, and a second air bag provided between the second upper support and the second clamping member, for inflating when the second clamping member fixes the second steel plate.

3. A laser welding system according to claim 2, further comprising a first air cylinder installed at the first upper support, for separating the first clamping member from the first steel plate after the welding is completed, and a second air cylinder installed at the second upper support, for separating the second clamping member from the second steel plate after the welding is completed.

4. A laser welding system according to claim 3, wherein the first clamping member is engaged with a first hinge, and the first air cylinder presses one side of the first clamping member to separate the first clamping member from the first steel plate after the welding is completed, whereas the second clamping member is engaged with a second hinge, and the second air cylinder presses one side of the second clamping member to separate the second clamping member from the second steel plate after the welding is completed.

5. A laser welding system according to claim 1, wherein a portion of the anvil has saw-teeth so that the second steel plate should not slide from the anvil when the anvil moves the second steel plate to the position at which the first steel plate is to be engaged with and welded with the second steel plate.

6. A laser welding system according to claim 1, wherein a plurality of first clamping members, a plurality of second clamping members, and a plurality of anvils are provided.

7. A laser welding system based on the claim 1, wherein the means for moving the anvil further comprises a third air cylinder installed at the lower support, for moving the anvil to an initial position after the welding is completed.

8. A laser welding system based on the claim 7, wherein the third air bag is shrunk after the welding is completed, and the third air cylinder presses one side of the pivoting member to move the anvil to the initial position.

9. A laser welding system according to claim 1, wherein the first clamping member has a first thickness which is thick enough not to bend when the first clamping member is operated, and the second clamping member has a second thickness which is thin enough to bend when the second clamping member is operated.

10. A laser welding system according to claim 1, wherein portions of the first and second clamping members at which the first and second clamping members are engaged with the first and second steel plates have saw-teeth respectively.

* * * * *